United States Patent Office.

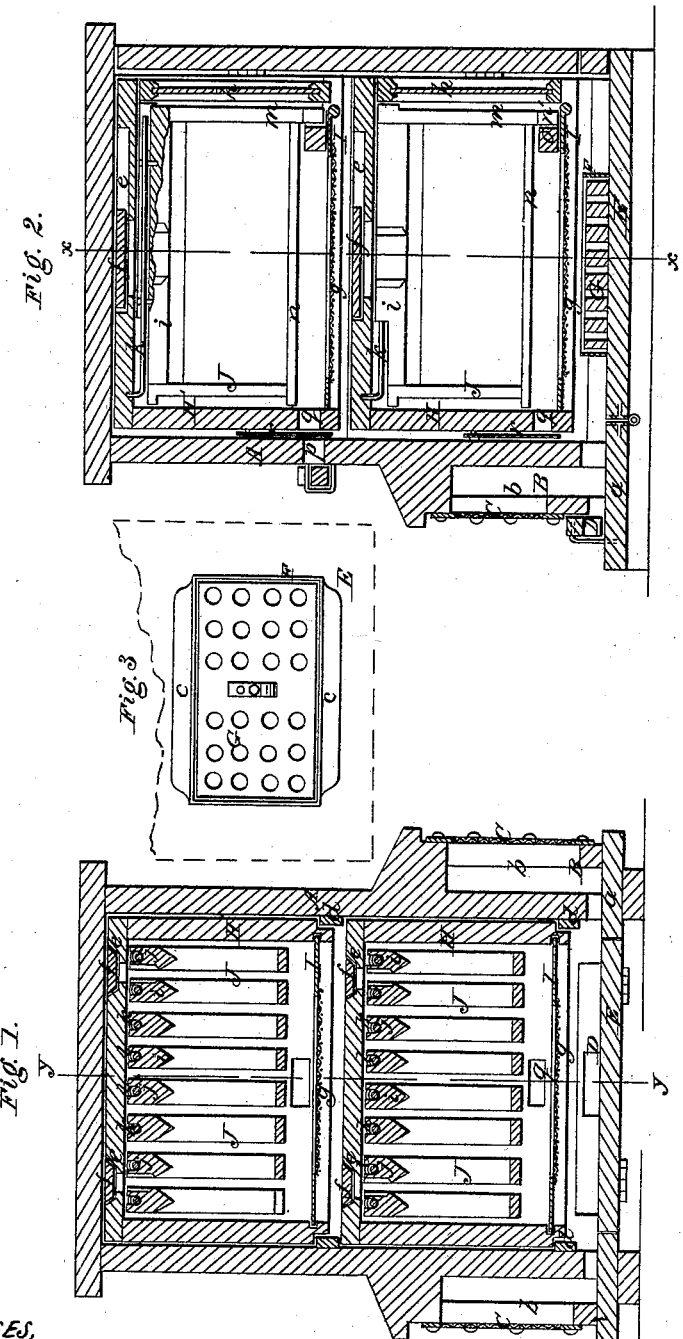

JESSE PEARSON, OF WEST MILTON, OHIO.

Letters Patent No. 86,441, dated February 2, 1869.

---

IMPROVEMENT IN BEE-HIVES.

---

The Schedule referred to in these Letters Patent and making part of the same.

---

*To all whom it may concern:*

Be it known that I, JESSE PEARSON, of West Milton, in the county of Miami, and State of Ohio, have invented a new and useful Improvement in Bee-Hives; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $x\ x$, fig. 2.

Figure 2 is a vertical section of the same, taken in the line $y\ y$, fig. 1.

Figure 3 is a detached plan or top view of the feeding box pertaining to the same.

Similar letters of reference indicate like parts.

This invention relates to a new and improved bee-hive; and

It consists in a peculiar construction of the same, whereby a perfect ventilation is obtained, and bee-moth excluded, the multiplication of colonies readily effected, honey removed from the hive, when desired, with the greatest facility, and bees fed, when required, without any trouble or difficulty whatever.

In the accompanying sheet of drawings—

A represents the body of the hive, which is of quadrilateral form, and of the usual or any proper dimensions, and is provided, at its rear side, with a door, by opening which the whole of the interior of the hive is rendered accessible.

The bottom board, $a$, of the hive, projects forward of the front and sides of the hive, and a casing, B, extends around the front and sides of the hive, said casing having open panels, covered with wire cloth, C, a dead-air space, $b$, being allowed between the wire cloth and the body of the hive.

The lower edges of the front and sides of the hive are notched out, to form ventilating and bee-passages, and the front of the case B, at its lower edge, is provided with an opening and a slide, D.

This latter opening constitutes the bee-entrance.

By this arrangement, it will be seen that air may be admitted into the lower part of the hive, at its front and both sides, and the miller prevented from entering and depositing her eggs.

The bottom, $a$, of the hive, is provided with a drop-door, E, hinged at its inner end, and held in a closed state by a hook at its opposite end, and on this bottom there is fitted, between guides, $c\ c$, a pan, F, containing a perforated float, G.

Food may be placed in this pan F, such as honey, molasses, sugar and water, &c.

This would be necessary in case the bees should fall short of a supply of food in winter or early spring.

The float G renders the food very accessible to the bees.

Within the body of the hive there are placed two boxes, H H', one directly over the other, but resting on separate ways or guides, $d\ d$, (see fig. 1,) so that one box may be withdrawn from the hive without the other.

Each box is provided with openings, $e$, in its top, which openings may be covered with slides, $f$, when required, and the bottoms of the boxes are formed of tin or sheet-metal slides I, having a large opening made in them, and covered with wire cloth, $g$, to be used, for convenience, when dividing colonies.

Each box is provided, at its rear side, with a glass door, $h$, and within these boxes the comb-frames, J, are fitted and secured, as follows:

In the upper surface of the top rail, $i$, of each comb-frame, there is made a longitudinal groove, $j$, and these grooves receive rods $k$, attached to the under sides of the tops of the boxes, wires or staples, $l$, being driven into the top rails, over the grooves $j$, which wires or staples hold the comb-frames on the rods $k$. (See fig. 1.)

The rear upright bars $m$, of the comb-frames, extend down below the bottom-rails $n$, of the comb-frames, and have tenons, $n'$, formed on their lower ends, which fit in recesses made in a bar, $o$, on the bottoms of the boxes.

By this arrangement, it will be seen that the comb-frames may be readily withdrawn from the boxes, and either box taken from the hive, and colonies divided, without allowing them to swarm, for, by withdrawing a box from the hive, and placing an empty one over it, and withdrawing the slides $f$, of the filled, and the slide I, of the other, a number of bees, with one queen, may be made to pass into the empty box, the slide I being closed or shoved in when one queen has passed through or into the empty box, and this box, when placed in an empty hive, with the upper box of the old colony above it, (care being taken to divide the bees,) will form a new colony.

The other box, containing the remnant of the old colony, may then be replaced in the hive from which it was taken, and an empty box placed over it.

A bee-entrance, $p$, is made in the front of the hive for the upper box, H', and both boxes have bee-entrances, $g\ g$, made in them, which may be covered by sheet-metal doors, $r$, when desired.

I am aware of the patents granted to Gushee and Dawes, October 11, 1859, and Alexander Clow, April 16, 1861, but as these contain no part of my invention, I claim nothing therein shown.

Having thus described my invention,

I claim as new, and desire to secure by Letters Patent—

1. The securing or suspending of the comb-frames J, within the boxes H H', by means of the rods $k$, attached to the under sides of the tops of the boxes, and the grooves $j$, made in the upper surfaces of the top rails $i$ of the comb-frames with the wires or staples $l$, driven in the rails $i$, over the grooves $j$, substantially as and for the purpose set forth.

2. The arrangement, upon the hinged bottom or door E, of the feed-pan F and float G, as herein described, for the purpose specified

JESSE PEARSON.

Witnesses:
AZURIAH STEWART,
JOSEPH FURNAS.